June 28, 1966

F. E. BELLAS ETAL 3,258,019

MOBILE CAR WASH UNIT

Filed June 9, 1964

INVENTORS
FREDERICK E. BELLAS
ROBERT A. DECKER

BY

*Rupert J. Brady*
ATTORNEY

June 28, 1966  F. E. BELLAS ETAL  3,258,019
MOBILE CAR WASH UNIT
Filed June 9, 1964  3 Sheets-Sheet 2

INVENTORS
FREDERICK E. BELLAS
BY ROBERT A. DECKER
*Rupert J. Brady*
ATTORNEY

June 28, 1966  F. E. BELLAS ETAL  3,258,019
MOBILE CAR WASH UNIT
Filed June 9, 1964  3 Sheets-Sheet 3
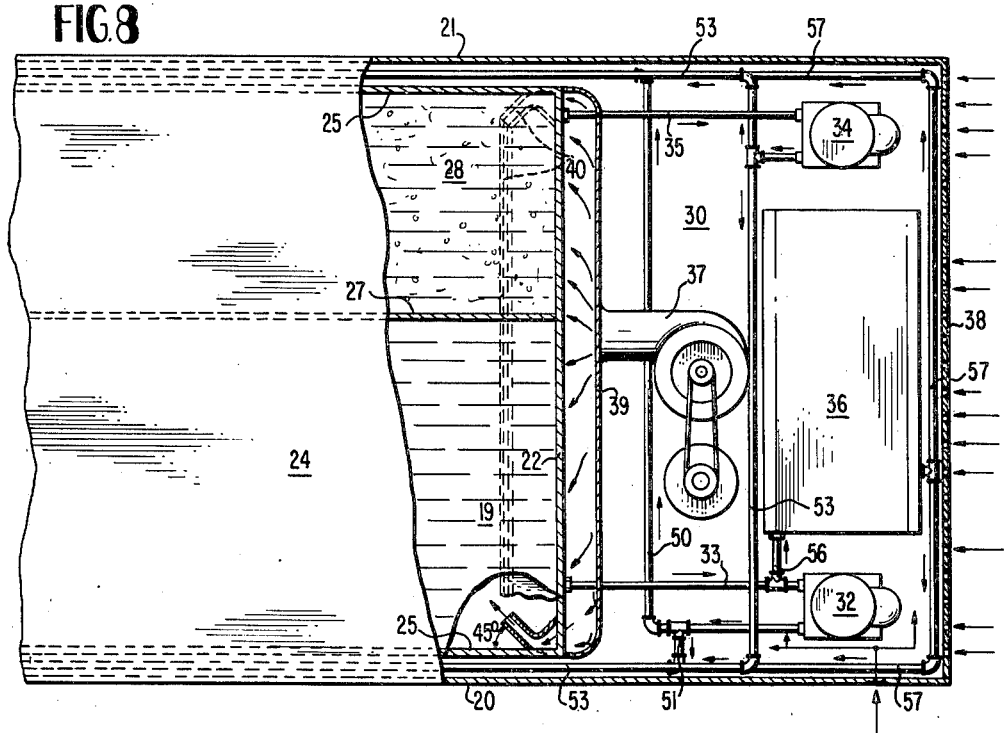
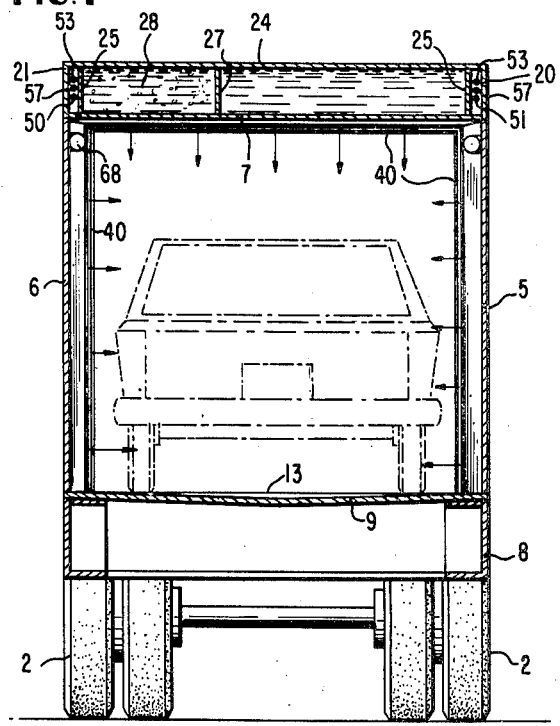
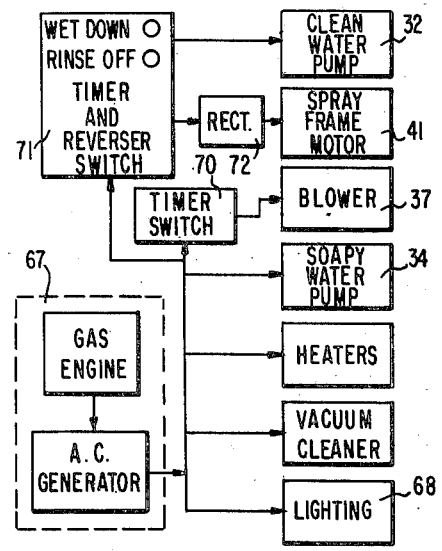
INVENTORS
FREDERICK E. BELLAS
ROBERT A. DECKER
BY
ATTORNEY United States Patent Office 3,258,019
Patented June 28, 1966

3,258,019
MOBILE CAR WASH UNIT
Frederick E. Bellas, 148 Zerby Ave., Edwardsville, Pa., and Robert A. Decker, 261 McLean St., Wilkes-Barre, Pa.
Filed June 9, 1964, Ser. No. 373,651
7 Claims. (Cl. 134—99)

This invention relates broadly to a car wash unit and more particularly to a mobile car wash unit which is completely self-contained and capable of traveling to any selected location.

The mobile car wash unit of the invention provides a new concept in service, convenience, and time-saving to the public. In order to have a car washed in an ordinary car washing establishment it is usually necessary to wait your turn in line for the washing operation. This can normally be expected to entail a wait of approximately one half to three-quarters of an hour. Additional time is consumed in the washing operation and in traveling to and from the washing establishment. Since car washing establishments are normally open only during regular business hours, it is usually necessary for the car owner to take time off from his job for at least an hour or more to have his car washed during the working day. During the remainder of the day his car is parked in a parking lot while the owner is at work. However, most parking lots do not provide car washing service so it is impossible for the owner to have his car washed while it is parked on the lot during the working day.

The object of the present invention is to provide a construction of mobile car wash unit that can be transported from place to place and provide complete and efficient car washing facilities without the need of exterior supply or waste exhaust connections of any type.

The unit of the present invention eliminates the necessity of time off from work or time out of leisure hours to have the family car washed. A person drives his dirty car to work and parks it in his usual parking space. The car owner merely tells the parking lot attendant that he wishes his car washed and then goes to work. The mobile car wash unit could be scheduled to make regular rounds of parking lots to wash the cars of those desiring the service while they are occupied at work or otherwise. The owner then returns to the parking lot at the end of the working day to pick up his clean car without any additional time spent on his part to have the car cleaned. The owner is now able to utilize this saved time for other advantages.

Units of the present invention in addition to operating at in-town parking locations may operate at remotely located industrial sites, suburban business and Government sites, shopping centers, public beaches, amusement parks, athletic stadiums, etc. The mobile car wash unit of the invention, by bringing a service to automobiles during normally idle hours, will have a tendency to create additional jobs, thus boosting employment, since car owners will have a tendency to have their cars washed more often.

Another object of the present invention is to provide a mobile car wash unit having a novel construction for storing car washing and rinsing liquids.

Another object of the invention is to provide a construction of mobile car wash unit which can be quickly set up for washing operation and readied for transportation with a minimum of effort.

A further object of the invention is to provide a novel construction of blower drying section in a mobile car wash unit and a novel means of housing the blower unit and power supply unit out of the way of the washing operation.

Other and further objects of the invention reside in the construction of the car washing spray frame, the extensible van portions on either side thereof, and the waste fluid drain compartment as set forth more fully in the specification hereinafter following by reference to the accompanying drawings, in which:

FIG. 7 is an enlarged cross-sectional view taken substantially along line 7—7 of FIG. 3;

FIG. 8 is an enlarged transverse sectional view of the forward top section of the mobile car wash unit; and FIG. 9 is a schematic block diagram of the power distribution system of the unit.

Figure 1:
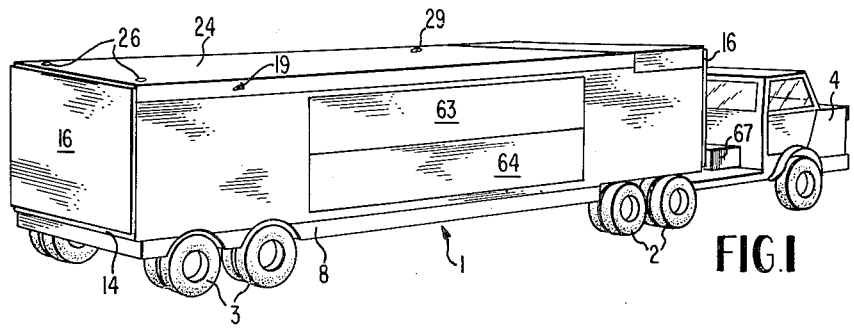
FIG. 1 is a perspective view of the mobile car wash unit of the invention disposed in a state for transporting from one locale to another.

Referring to the drawings in greater detail, the mobile car wash unit of the invention comprises a van body portion 1 supported by front and rear axles 2 and 3, respectively, in the usual manner with the front axles 2, which are a portion of cab 4, pivotally connected through the usual type fifth wheel connection to the base of the van body portion so as to enable the relatively long van to negotiate corners. Van body portion 1 is thus connected to and transported by a cab or tractor, indicated generally at 4, in the usual manner. A pair of support wheels, not shown, may be pivotally connected beneath the front portion of the van body for lowering from a normally raised position to support the front portion in the usual manner if the cab is disconnected from the van body portion. It is to be understood that several arrangements of the supporting axles are possible without departing from the scope of the invention. In normal washing operation the cab remains connected to the van and is swung to one side of the van.

Van body portion 1 consists of side wall portions 5 and 6 and top wall portion 7 constructed upon the base or chassis portion, indicated generally at 8, of the usual type, with the bottom portion of the van provided with floor 9 which slopes inwardly from the sides toward the center of the van body portion and is provided with drains 10 along the longitudinal center axis of the floor. With the floor 9 arranged with the slope as shown and described, the wash water tends to drain toward the center of the floor and through the drains into the rectangular sludge drain pan 11 bolted beneath the drain area and to the floor 9 between the front and rear axles, beneath the spray area of the van body portion. Although floor 9 is schematically shown, it would be constructed of a plurality of horizontal cross-ribbing to which the upper flange of sludge drain pan 11 is bolted, forming a water-tight seal between the securing flange of the pan and the lower surface of the floor.

Sludge drain pan 11 is preferably designed to hold approximately 2000 gallons of waste wash water, in addition to some sixty odd gallons of dirt and sludge, and is of a depth to provide a small air space above the liquid level so that splashing of the water in the pan, as the unit is transported away from its place of operation at the end of an operating period, will not cause leakage of the waste water from the vehicle. In this manner the unit of the invention is able to carry all of its own dirty waste water and sludge washed from the automobiles in its entire daily operation. Sludge drain pan 11 is provided with drain faucets 12, preferably in the four corners thereof to allow the waste water and sludge to be drained from the pan at a suitable location. In this way, if the unit of the invention is operating at a parking lot, no dirty water or sludge drains onto the parking lot.

As shown particularly in FIG. 7, a metal riser strip 13 extends laterally across the ends of floor 9 adjacent the front and rear openings of the van, at a level slightly above that of the sloping floor, to prevent water from leaving the van via these openings. These strips thus direct the water back into the van toward the drains 10. Side wall portions 5 and 6 and top wall portion 7 are preferably constructed of small I-beams spaced approximately eighteen inches on center with a sheathing of sheet aluminum, or the like, connected to the outer surfaces of the vertically disposed I-beams (not shown), to complete the construction of the side wall portions.

Figure 2:
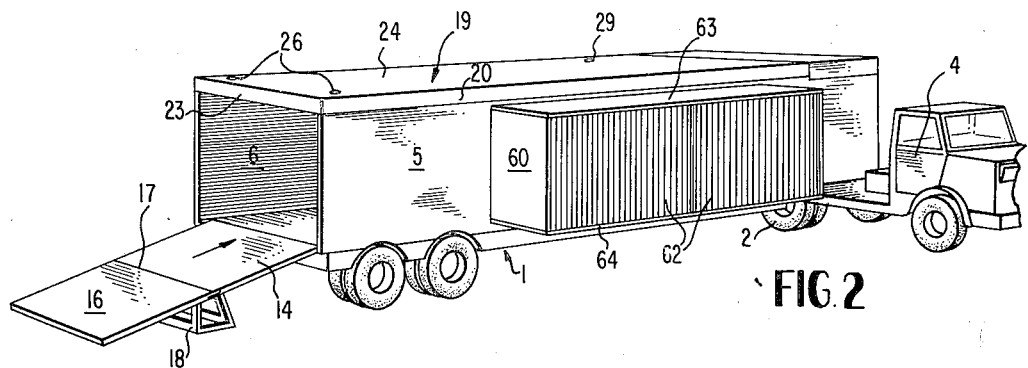
FIG. 2 is a perspective view showing the unit of FIG. 1 prepared for car washing operations.
Figure 3:
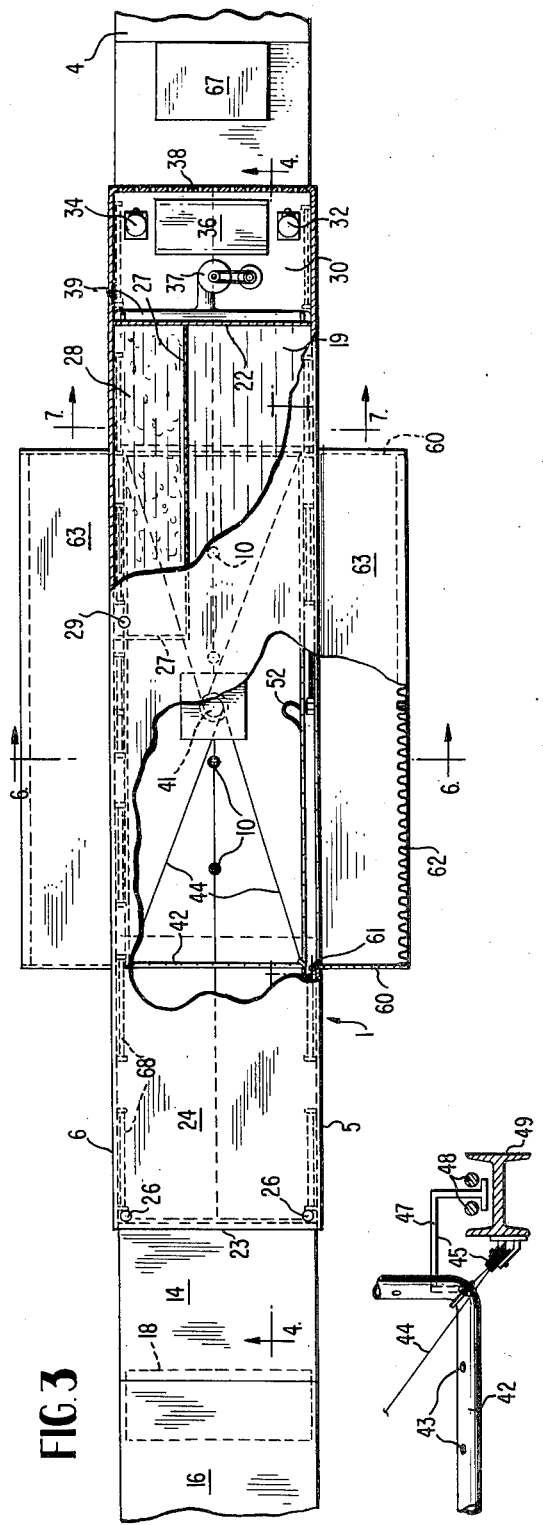
FIG. 3 is an enlarged top plan view of the unit of FIG. 2, with various components shown in phantom and with portions shown in break-away section.
Figure 4:
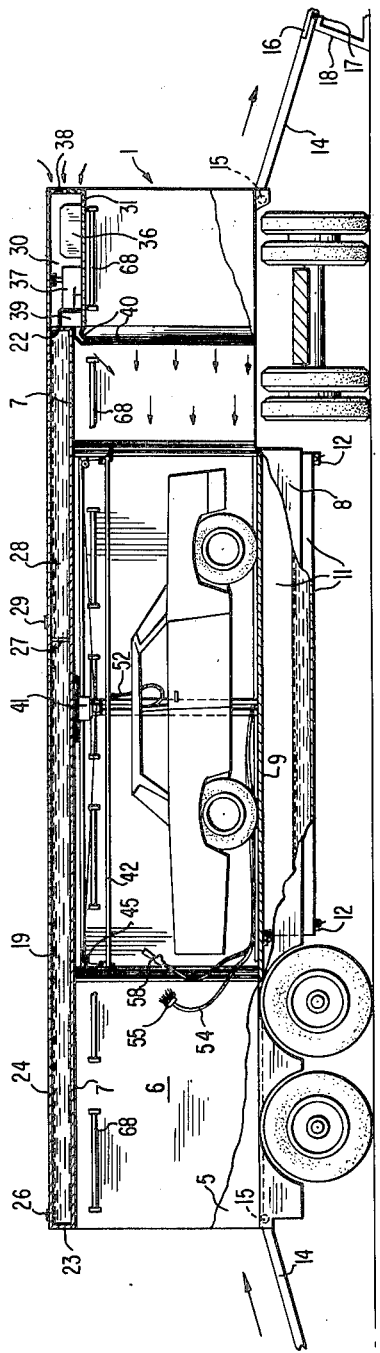
FIG. 4 is a longitudinal sectional view, partly in side elevation, taken substantially along line 4—4 of FIG. 3.

The front and rear openings of van body portion 1 are closed by full width tailgate members 14 hinged at 15 to chassis portion 8. Second tailgate members 16 are hinged at 17 to the top portions of tailgate members 14, so as to overlie tailgate members 14 when folded into the vertical plane to the closed position as shown in FIG. 1, to thus close the front and rear openings of the van body portion. As shown in FIGS. 2, 3 and 4, when the tailgate sections 14 and 16 are lowered, they are pivoted about hinges 15 and 17 into end-to-end locking relation to form ramps from the ground level to the inner floor 9 of the van body portion. Support members 18 normally carried within the van, during transportation, may be placed beneath the tailgate hinges 17, to provide additional support to the tailgate ramps. Cars enter the van body portion up the ramp at the rear of the van, and after passing through the van, leave the same by descending the ramp at the forward end of the van.

As previously stated, top wall portion 7 is constructed of a plurality of horizontal cross-ribs (not shown) to provide sufficient rigidity and support for the van body. By way of illustration, van body portion 1 is approximately forty feet in length and eight feet in width. The van body portion is provided with an overhead compartment 19 extending substantially the full length and width of the vehicle which is formed as an integral part of the van body portion. The bottom of overhead compartment 19 is formed by reinforced top wall portion 7 while the remainder of the compartment is enclosed by vertical side wall extensions 20 and 21, front and rear walls 22 and 23, respectively, and compartment top wall portion 24 which forms the roof of van body portion 1. The inside walls 25, as shown more particularly in FIG. 8, of overhead compartment 19 are constructed of a noncorrosive material and sufficient spacing is maintained between walls 25, 20 and 21 to allow for the passage of fluid-conducting pipes in the spacing, as explained more fully hereinafter following. By way of example, overhead compartment 19 may be approximately thirty-five or thirty-six feet in length, seven and one-half feet in width and one foot in depth and provides for the storage of approximately 1731 gallons of clean water for use in the "wet down" and "rinse off" stages of the car washing operation. This compartment is provided with a pair of fill inlets 26 through which clean water is admitted to the overhead compartment, for storage therein at the start of the day's operation.

A portion of overhead compartment 19 is partitioned at 27 to form a second storage compartment 28 within overhead compartment 19. This second compartment is much smaller than compartment 19 and is independently filled through inlet 29 with a quantity of soapy water mixture at the beginning of the day's operation, for use in the washing operation. The size of this compartment is such as to store approximately 269 gallons of soapy water.

A second overhead compartment 30 is provided between front wall 22 of compartment 19 and the open front portion of van body 1, as shown particularly in FIGS. 3, 4 and 8, with this compartment having its bottom wall 31 dropped somewhat below the level of top wall portion 7 to provide more vertical space for the equipment housed therein. This compartment houses a clean water pump 32 connected through conduit 33 to draw clean water from overhead compartment 19, and a soapy water pump 34 connected through conduit 35 to draw soapy water from second storage compartment 28. A steam generator unit, of known design, with its own fuel storage, indicated generally at 36, and a motor-driven blower unit 37, are also housed within second overhead compartment unit 30.

Motor-driven blower unit 37 draws in air through the perforated front wall portion 38 of second overhead compartment 30 and discharges the same into a distribution manifold 39 provided with an opening extending laterally across the vehicle between the different levels of top wall portion 7 and bottom wall 31 as shown more particularly in FIG. 4. The discharge opening of manifold 39 opens into a hollow exhaust lip 40 extending along the bottom of top wall portion 7 and vertically along the inner sides of side wall portions 5 and 6. Hollow exhaust lip 40 extends outwardly from the inner side walls of the van at an angle of 45 degrees and is provided with a relatively small edge opening throughout its length, for instance, an opening of approximately one-half inch, so as to discharge a thin layer of air on the top and sides of a vehicle passing therethrough with the air striking the vehicle at an angle of 45 degrees to create a good shearing-blowing effect on the water standing on the car to strip the water from the car and dry the same. Motor-driven blower unit 37 may be selected from among the wide variety of motor-blower units on the market, but preferably should be capable of creating a discharge pressure of approximately 15.44 p.s.i.a. at the discharge lip opening so that the air exhausted from this lip is discharged at a speed of approximately one hundred miles per hour. A motor-blower unit of approximately 48.3 horsepower is required for efficient operation.

Figure 5:
FIG. 5 is an enlarged top plan view, partly in section, of a fragmentary portion of the spray frame structure and particularly showing the spray frame guide structure.

An electric motor 41 is connected to top wall portion 7, substantially centrally of the van so as to extend downwardly therefrom. A hollow rectangular spray frame 42 having a plurality of nozzle apertures 43 disposed along its length is positioned below motor 41 and is connected thereto by means of cables 44 extending from the four corners of the spray frame over pulleys 45 connected to the van side wall structure with the terminating ends of the cables connected to winding drum 46 driven by motor 41. Spray frame 42 is of sufficient length and width to encompass the largest automobiles. Guide members 47 are connected to each corner of spray frame 42 and extend into sliding relation with guide tracks 48 which are connected stationary to the inner sides of side wall portions 5 and 6 and preferably within one of the vertically disposed I-beams 49 forming the side wall, as illustrated particularly in FIG. 5. When motor 41 is energized winding drum 46 rotates to lower the spray frame by means of the cable pulley connections and the spray frame is maintained in position by means of the guide members 47 and 48 through its vertical travel. When the motor 41 is reversed the spray frame is again raised above the roof level of the automobile.

Clean water pump 32 is a standard type quick start-and-stop pump so that it may be synchronized with the descending and ascending movements of spray frame 42. Clean water pump 32 supplies clean water to conduits 50 and 51 which extend in the space between inside walls 25 and side wall extensions 20 and 21 to the area of spray frame 42. These pipes then pass downwardly through top wall portion 7 and are connected by flexible hoses 52 to spray frame 42 so as to supply clean water to opposite sides of the spray frame.

Soapy water pump 34 supplies soapy water to conduits 53 which are disposed in the mentioned space with conduits 50 and 51 along opposite sides of the van and extend to the area of the spray frame through top wall portion 7 and terminate in faucets at an appropriate place adjacent the spray frame where they are connected to flexible hose 54 terminated by soapy water excreting brushes 55. Steam generator unit 36 carrying its own oil fuel supply is of standard design, and is connected at 56 to clean water pump 32 to draw water therefrom for conversion into steam. Steam generator outlet conduits 57 extend adjacent soapy water conduits 53 to the area of the spray frame in the same manner where they terminate in steam nozzles 58 which are connected thereto by appropriate flexible hosing. The steam nozzles are used in the normal manner in the cleaning operation for steaming the caked dirt from the tires and bumpers of the vehicle before the spraying operation.

Van body portion 1 is of sufficient length to enable working room in front and back of the car being cleaned, but it is necessary to provide additional side working space to enable the workers sufficient room to use the soapy water injecting brushes 55 and steam nozzles 58 on the side of the car and also to enable sufficient room for the workers to enter and leave the car for cleaning the interior. To provide sufficient space, openings of approximately twenty feet in length are provided along each side wall portion 5 and 6 of the van in the area of spray frame 42. A pair of door sections 60 are vertically hinged at 61 interior of the van so as to be disposed inside the van when in closed position, as indicated in FIG. 1. A pair of collapsible folding doors 62 are secured to the free vertical interior edge of the door sections 60 so as to extend interior of the van during transportation. A pair of cooperating horizontal door sections 63 and 64 are hinged along their upper and lower edges at 65 and 66, respectively, to the top and bottom edges of the side wall openings provided in the van for the extensible portions with the free ends of the doors lying adjacent each other in the closed position, as indicated in FIG. 1, to close the openings during transportation. In the closed position, horizontal door sections 63 and 64 are disposed flush with side wall portions 5 and 6.

Figure 6:
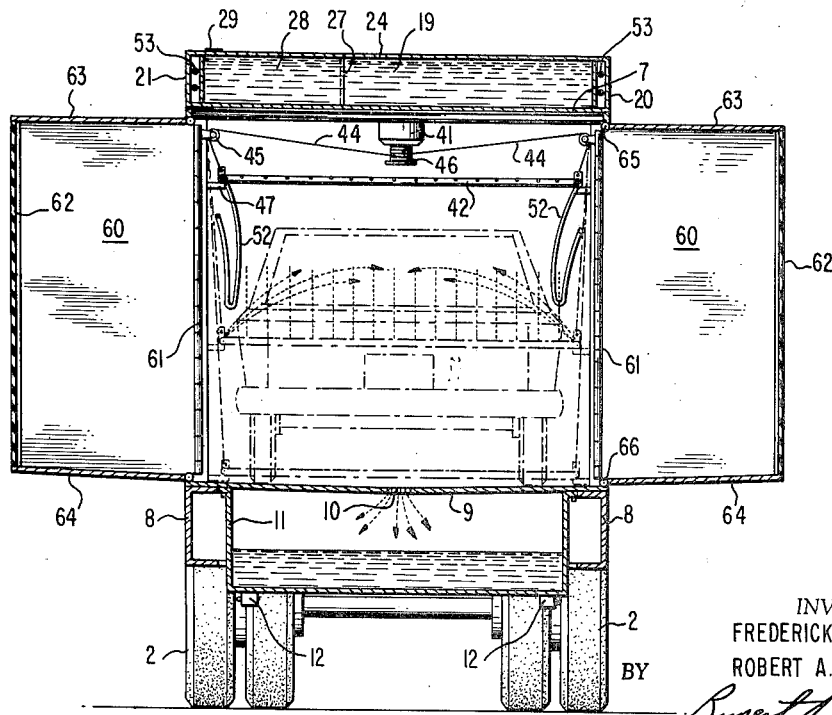
FIG. 6 is an enlarged cross-sectional view taken substantially on line 6—6 of FIG. 3.

Horizontal door sections 64 are preferably counterbalanced by conventional means, not shown, similar to the tailgate of a station wagon, so that when they are folded outwardly and downwardly they will remain in horizontal position as indicated in FIG. 6. Horizontal door sections 63 are then raised upwardly and door sections 60 are swung outwardly to support the ends of horizontal door sections 63 and maintain them in the raised position. The collapsible folding doors 62 are then drawn inwardly toward each other and fastened together to form a back wall for the extended side wall portions of the van body. With the horizontal door sections 63 and 64 on opposite sides of the van extended in this manner, with each providing approximately three and one half feet of additional working space on opposite sides of the spray frame area, the overall width of the van body is increased by approximately seven feet to provide sufficient working space for the operators to perform efficiently.

In lieu of collapsible folding doors 62 a plurality of door panels constructed of thin corrugated material may be vertically hinged to each other and to door sections 60 so as to fold back upon each other in overlying relation when in the folded position. When door sections 60 are swung to their extended position, as shown in FIG. 2, the corrugated door panels can be unfolded to form a back wall for the side extended portions in the same manner as folding doors 62. Another arrangement would be to have two additional horizontal door sections hingedly connected to the lower free end of top horizontal door section 63 so that when this door section is swung upwardly to form the roof of the side section, the two additional thin corrugated horizontal door sections hinged thereto can be folded downwardly to close the back of the extended portion. They will extend downwardly to meet horizontal door sections 64 forming the floor of the side sections. In each of the arrangements the horizontal door sections 64, forming the floor portion, are preferably inclined slightly so as to direct splashed water toward the drains 10.

Power for the mobile car wash of the invention is provided by a motor generator unit 67 located at an appropriate place on the cab chassis 4 and being of approximately 172 horsepower and capable of producing approximately 75 kilowatts of electric power. In lieu of this completely separate motor generator unit, since the cab for pulling the van is to remain at the site of operation, an A.C. generator may be provided on the cab's chassis and driven by the cab engine to produce the desired power. It is necessary to provide only a cable connection between the van and cab to provide power to the van. The power distribution system is illustrated in the schematic block diagram of FIG. 9, which indicates that soapy water pump 34 derives its power directly from the generator unit and is controlled by either switches in the area of the spray frame or by switches on the brushes 55. The fluorescent lighting 68 disbursed throughout the vehicle and interior electrical outlets for heaters, not shown, and exterior electrical outlets for vacuum-cleaning equipment, not shown, are also powered by the motor generator unit 67. Electrical conduits are connected through the walls of the van to the electrical outlets in the usual manner. The motor for blower unit 37, which may have a heater (not shown) connected thereto for heating the blower discharge air is supplied with power from the motor generator unit through a manual timeswitch 70 of standard construction which keeps the blower unit energized for a predetermined time interval when the switch is thrown. Clean water pump 32 and the three-speed reversing motor 41 for raising and lowering spray frame 42 are energized by the motor generator through a timer and reversing switch mechanism 71, of normal construction, which controls the raising and lowering of the spray frame and the supply of water thereto. The current output of timer switch 71 is rectified at 72 before being applied to motor 41 since motor 41 is preferably a reversible D.C. motor. The timer and reversing switch mechanism 71 and rectifier 72, not shown in the other views, may be located at any convenient place in the van such as on the side wall beneath second overhead compartment 30.

In operation, five workers are usually involved, two of whom are inside the unit in each of the extended side portions, and three of whom are outside the unit, for driving the cars to be washed. After the unit has been set up a worker vacuums the inside of the car with a vacuum cleaner connected to an exterior electrical outlet on the van. He then drives the car up the rear tailgate ramp to the area beneath the rectangular spray frame 42 which is normally in the raised position. Entering the van, normally takes approximately fifteen seconds. The driver remains in the car and proceeds to wipe down the interior of the car and the windows, while it is undergoing the next phases of the operation.

One of the inside workers then depresses an electrical control button on the inside wall which energizes the reversing switch 71 to energize pump 32, and after a one second time delay, which allows clean water pump 32 to come up to speed, clean water begins to spray from the nozzles 43 of spray frame 42 and three-speed motor 41 is simultaneously energized by the timer switch and begins to lower the spray frame about the car at the center speed of the three-speed motor. During its four second downward travel the spray frame completely wets down the car with clean water and as the frame approaches the level of the floor, timer and reverse switch 71 instantaneously reverses motor 41 and switches it into high speed to raise frame 42 at the highest speed of the motor, to the horizontal starting position above the roof level of the car. The raising operation requires approximately two seconds, and the car has been completely wet down with clean water in a seven second interval.

The workers in the side extended portions then clean the car tires and with the steam nozzles 58 clean the bumpers and grill. This phase of the operation requires approximately forty seconds.

With brushes 55 the workers then apply soapy water over the entire body surface of the car with the brushes and detergent, removing the hardened dirt and grime. This soaping-down phase requires approximately sixty-five seconds.

The timer and reverse switch 71 is energized by depressing a low speed spray frame control button which operates clean water pump 32 and after one second, when it is up to speed, energizes motor 41 to operate it at its lowest speed. Spray frame 42 descends toward the floor of the van spraying clean water over the surface of the car and rinsing off the dirt and soapy water. The descent requires approximately twenty seconds and when the frame reaches the lowest limit adjacent the floor, timer 71 automatically stops pump 32, reverses motor 41 and raises the frame at the highest speed of the motor. This rinse off phase requires a total of approximately twenty three seconds.

By this time the worker inside the car has cleaned the car interior and he then drives the car toward the front exit at a slow rate of speed of approximately one foot per second. As the car leaves the spray frame area, one of the workers in the side extended portions actuates timer switch 70 to activate blower 37. As the car passes through the blower area of the van, the stream of air issuing from exhaust lip 40 at a high rate of speed hits the car surface at 45 degrees and skims the water from the surface. Approximately thirty seconds elapse from the time the car leaves the spray area to the time it exits from the van body portion by way of the front tailgate ramp.

Thus, a total of approximately one-hundred-eighty seconds, or three minutes, and approximately 12 gallons of water, clean and soapy, are used in the washing and drying operation within the van. When the car leaves the unit, the first driver gets out of the car and is met by the third driver. The two of them proceed to clean and dry, with soft cloths, any spots on the car which were missed during the operation inside the van. The first driver then returns his cleaned car to its parking space and the third driver returns to his car, near the entrance ramp, to complete the vacuuming operation. In the meantime, the second driver has already vacuumed the inside of his car and has entered the car wash unit and is in the midst of the washing operation.

All of the dirty wash water and dirt washed from the cars is caught in drain pan 11 so that no dirty water is deposited at the parking lot. The drain pan is emptied at a suitable location after leaving the lot at the end of the day's washing. It is possible to wash one hundred sixty cars in an eight hour working day with the unit of the invention.

While the invention has been described in certain preferred embodiments, it is realized that modifications can be made without departing from the spirit of the invention, and it is to be understood that no limitations on the invention are intended other than those imposed by the scope of the appended claims.

What is claimed is:

1. A portable mobile car wash unit comprising a transportable van body portion, water spray means connected interior of said van body portion, generally rectangular water storage compartment means extending longitudinally of the van body portion and laterally of the van body portion substantially throughout the length of the water storage compartment means forming the top of said van body portion above said water spray means, said water storage compartment means divided into first and second overhead storage compartments with said first overhead compartment adapted to store clean water and said second overhead compartment adapted to store a soapy solution, soapy solution ejecting means connected interior of said van body portion adjacent said water spray means, said soapy solution ejecting means connected to selectively receive soapy solution from said second overhead compartment, said water spray means connected to selectively receive clean water from said first overhead compartment, and said soapy solution ejecting means and said water spray means connected for movement relative to each other.

2. A portable mobile car wash unit comprising a transportable van body portion having a top wall portion, a floor portion, side wall portions and generally open end portions for the entrance and exit of cars, generally closed water storage compartment means including a pair of horizontally disposed plate body portions connected in spaced substantially parallel relation extending substantially the length and breadth of said van body portion forming said top wall portion, water spray means connected adjacent said top wall portion and positioned beneath said water storage compartment means interior of said van body portion and adapted to be lowered and raised about a car positioned between said water storage compartment means and said floor portion, and means connected to selectively supply water from said generally closed water storage compartment means to said water spray means, whereby the water supply for said car wash unit is carried in said generally closed water storage compartment means.

3. A portable car wash unit as set forth in claim 2 in which said water spray means includes a rectangular frame adapted to encompass a car, said frame having a plurality of water ejecting nozzles throughout its length, a motor connected beneath said top wall portion substantially centrally of said frame, a winding drum connected in depending relation on said motor for rotation thereof about a vertical axis, and cable means extending diagonally of said frame connecting the corners of said rectangular frame to said winding drum, whereby said cable means are wound and unwound on said winding drum when said motor is energized to raise and lower said rectangular frame about a car.

4. A portable mobile car wash unit comprising a transportable van body portion having a top wall portion, a floor portion, side wall portions and generally open end portions for the entrance and exit of cars, water storage compartment means formed in said top wall portion and extending laterally of said van body portion and substantially throughout its length, water spray means connected adjacent said top wall portion interior of said van body portion and adapted to be lowered and raised about a car, means connected to supply water from said water storage compartment means to said water spray means whereby the water supply for said car wash unit is carried in said water storage compartment means, separate storage compartment means in said top wall portion forwardly of said water storage compartment, blower means connected in said separate storage compartment, and a blower exhaust lip connected to said blower means and at an acute angle to said top and side wall portions to direct a stream of air onto the car surface at an acute angle to shear the water therefrom as a car passes through said blower exhaust lip.

5. A portable car wash unit as set forth in claim 4, in which said blower exhaust lip is connected to direct an air stream outwardly at 45 degrees to said side wall and top wall portions.

6. A portable car wash unit as set forth in claim 4 in which said means connected to supply water from said water storage compartment means to said water spray means includes pump means connected in said separate storage compartment means.

7. A portable car wash unit as set forth in claim 4 including a steam generator unit connected in said separate storage compartment means, and steam nozzle means in said van body portion adjacent said water spray means connected to said steam generator unit for steam cleaning cars passing through said van body portion.

References Cited by the Examiner

UNITED STATES PATENTS

| | | | |
|---|---|---|---|
| 2,412,342 | 12/1946 | Kallusky | 134—115 X |
| 2,536,843 | 1/1951 | Dye | 134—99 X |
| 2,689,577 | 9/1954 | Dunn et al. | 134—123 |
| 2,708,446 | 5/1955 | Phillips | 134—123 X |
| 2,727,781 | 12/1955 | D'Eath | 296—61 |
| 2,826,785 | 3/1958 | McCanless | 296—23 X |
| 2,896,644 | 7/1959 | Emanuel | 134—99 |
| 2,981,266 | 4/1961 | Tamburri | 134—123 X |
| 2,991,121 | 7/1961 | Barenyi | 296—28 X |
| 3,102,545 | 9/1963 | Knight et al. | 134—45 |

FOREIGN PATENTS 782,979  9/1957  Great Britain.

CHARLES A. WILLMUTH, *Primary Examiner.*

ROBERT L. BLEUTGE, *Assistant Examiner.*